(12) United States Patent
Lee et al.

(10) Patent No.: US 9,331,417 B2
(45) Date of Patent: May 3, 2016

(54) ELECTRONIC DEVICES WITH HOUSING PORT SHUTTERS

(71) Applicant: Apple Inc., Cupertino, CA (US)

(72) Inventors: SungChang Lee, San Jose, CA (US); Kee Suk Ryu, Cupertino, CA (US); Ki Myung Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 14/282,819

(22) Filed: May 20, 2014

(65) Prior Publication Data

US 2015/0340795 A1   Nov. 26, 2015

(51) Int. Cl.
*H04R 1/02* (2006.01)
*H01R 13/447* (2006.01)

(52) U.S. Cl.
CPC .............. *H01R 13/447* (2013.01); *H04R 1/028* (2013.01)

(58) Field of Classification Search
CPC .............................. H04R 2499/11; H04R 5/02
USPC .......................................................... 381/334
See application file for complete search history.

(56) References Cited

U.S. PATENT DOCUMENTS

| 6,819,946 B2 | 11/2004 | Hansson |
| 2004/0203996 A1* | 10/2004 | Hansson ................. H04M 1/03 455/550.1 |
| 2009/0245565 A1* | 10/2009 | Mittleman ............ H04M 1/035 381/365 |
| 2012/0037536 A1 | 2/2012 | Lonsdale, II et al. |
| 2013/0063004 A1* | 3/2013 | Lai ........................ G06F 1/1688 312/223.1 |
| 2013/0329928 A1 | 12/2013 | Ooe et al. |
| 2014/0140558 A1* | 5/2014 | Kwong .................. H04R 3/007 381/345 |

* cited by examiner

*Primary Examiner* — Simon King
(74) *Attorney, Agent, or Firm* — Treyz Law Group, P.C.; G. Victor Treyz; Zachary D. Hadd

(57) ABSTRACT

An electronic device may have a housing in which a display and other components are mounted. Audio components such as a speaker and microphone and other electrical components may be mounted in an interior portion of the housing. A housing port may be formed from one or more openings that pass through the housing. The audio component or other component may be aligned with the housing port. A shutter may be interposed between the audio component and the housing port. The shutter may have an electrically controlled positioner that is used to position a movable shutter member. The shutter may be closed by placing the shutter member in a position in which the housing openings are blocked, thereby preventing intrusion of contaminants into the interior portion of the housing. The shutter may be opened by placing the shutter member in a position in which the housing openings are unblocked, thereby allowing sound to pass through the housing port.

17 Claims, 14 Drawing Sheets

ELECTRONIC DEVICES WITH HOUSING PORT SHUTTERS

BACKGROUND

This relates generally to electronic devices with ports, and, more particularly, to shutter structures for selectively blocking ports when not in use to prevent intrusion of contaminants.

Electronic devices include components such as audio components. An electronic device housing may be provided with audio ports to accommodate audio components. For example, an electronic device may have a microphone port and a speaker port. A microphone can be mounted in the microphone port to capture sound. Audio signals can be played on a speaker that is mounted in a speaker port.

Electronic devices such as laptop computers, cellular telephones, and other portable electronic devices are often exposed to environmental contaminants. For example, a user of a portable computer or cellular telephone may accidentally expose the computer or cellular telephone to moisture or dirt. Contaminants can disrupt the operation of an electronic device. For example, contaminants can prevent sound from properly entering or exiting the device through an audio port.

It would therefore be desirable to be able to provide ways to prevent intrusion of contaminants into an electronic device.

SUMMARY

An electronic device may have a housing in which a display and other components are mounted. Audio components such as a speaker and microphone and other electrical components may be mounted in an interior portion of the housing.

The electronic device may have ports in the housing. Each housing port may be formed from one or more openings that pass through the housing. An audio component or other electrical component in the interior of the housing may be aligned with a housing port.

A shutter may be interposed between the component and the housing port. The shutter may have an electrically controlled positioner that is used to position a movable shutter member. The shutter member may have openings such as slots or may be free of openings.

The shutter may be closed by placing the shutter member in a position in which the housing openings are blocked, thereby preventing intrusion of contaminants into the interior portion of the housing and preventing the port from becoming blocked by the presence of contaminants. The shutter may be opened by placing the shutter member in a position in which the shutter member openings overlap the housing openings or in which the housing openings are otherwise unblocked, thereby allowing sound to pass through the housing port.

DETAILED DESCRIPTION

Electronic devices may be provided with ports for audio components and other components. The ports may be provided with shutters to prevent intrusion of contaminants into interior portions of the electronic devices.

Figure 1:
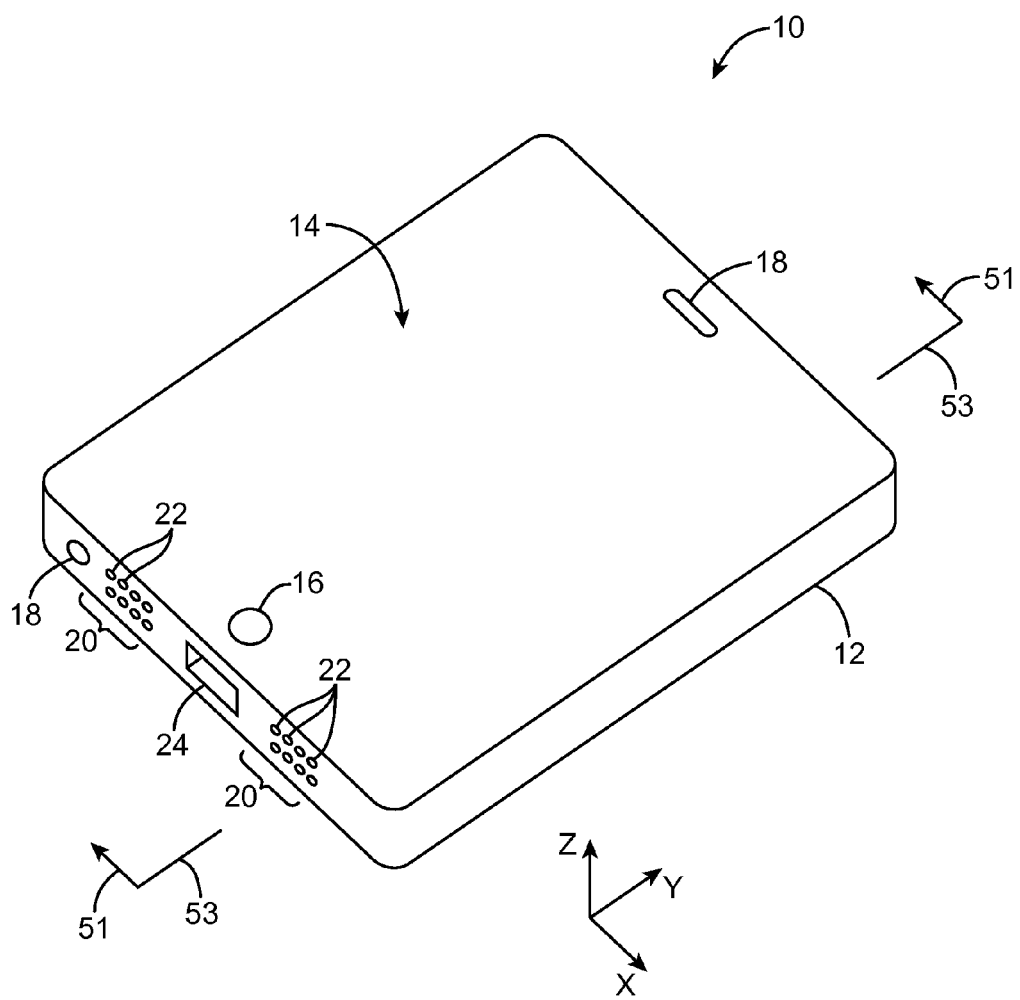
FIG. 1 is a perspective view of an illustrative electronic device such as a portable electronic device that has ports in accordance with an embodiment.

FIG. 1 is a perspective view of an illustrative electronic device of the type that may be provided with port shutters. An electronic device such as electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have a rear wall and four sidewalls that surround display 14.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Device 10 may have one or more ports. The ports may be formed from openings that pass through housing 12, display 14, or other portions of device 10. The ports of device 10 (e.g., housing ports) may include audio ports, connector ports, and other ports. As an example, device housing 12 may include ports 20. Ports 20 may each have one or more openings such as openings 22. In the example of FIG. 1, each port 20 has eight openings 22. If desired, ports such as port 20 may each have a single opening, may each have two openings, may each have three or more openings, may each have fewer than 100 openings, or may have other suitable number of openings.

Openings in housing 12 such as openings 22 of ports 20 may allow sound to pass. For example, one of ports 20 may be associated with a microphone and may use openings 22 in housing 12 to allow sound from the exterior of device 10 to pass to a microphone in the interior of device 10 and another of ports 20 may be associated with a speaker and may use openings 22 in housing 12 to allow sound from the speaker to pass from the interior to the exterior of device 10 (i.e., to allow sound to exit device 10 from the interior of device 10).

Device 10 may also have additional ports such as ports 18 and 24. Port 18 may be an audio jack port that is configured to receive a mating audio plug (e.g., a ⅛" tip-ring-sleeve or tip-ring-ring-sleeve plug). Port 24 may be a digital data port having a digital data connector that is configured to receive a mating connector on a digital data cable. Other types of ports may be provided in device 10 and housing 12 if desired. In the example of FIG. 1, the ports in housing 12 such as ports 18, 20, and 24 are formed in a housing sidewall at the lower end of device 10. This is merely illustrative. Ports can be formed along any peripheral edge of device housing 12, in a rear portion of housing 12, in a portion of display 14 or other structures on the front face of device 10, or in other suitable device locations.

Figure 2:
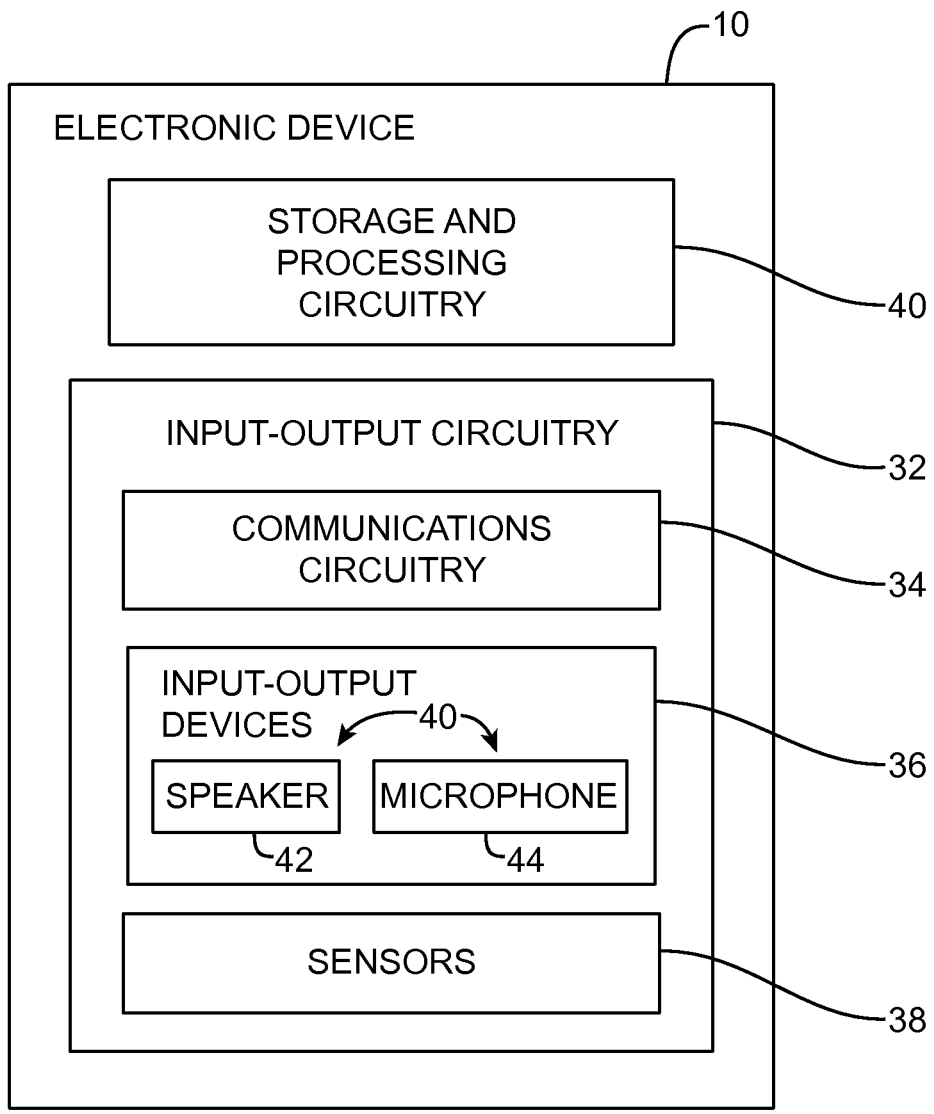
FIG. 2 is a schematic diagram of an illustrative electronic device that may be provided with a shutter to prevent intrusion of contaminants though a port in accordance with an embodiment.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphone 44 and speaker 42, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures.

Figure 3:
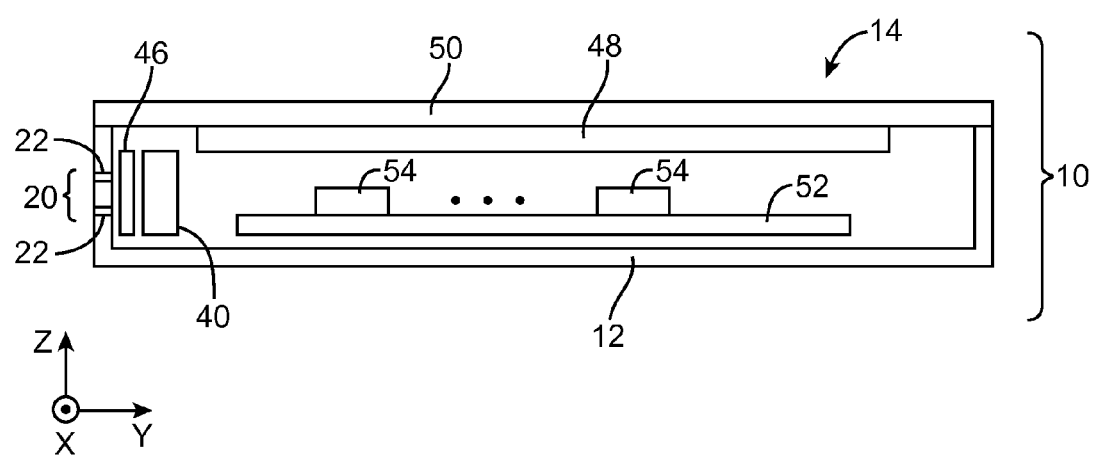
FIG. 3 is an cross-sectional side view of an illustrative electronic device in which a port in an electronic housing has been provided with a shutter than can be deployed to block contaminants in accordance with an embodiment.

A cross-sectional side view of device 10 of FIG. 1 taken along line 53 of FIG. 1 and viewed in direction 51 is shown in FIG. 3. As shown in FIG. 3, display 14 of device 10 may be formed from display module 48. Display module 48 may be a liquid crystal display module, may be an organic light-emitting diode display module, or may be formed from other types of display structures. Display cover layer 50 may be formed from a clear layer of glass or plastic and may be used to protect display module 48.

Device 10 may have one or more substrates such as substrate 52. Substrate 52 may be a printed circuit such as a flexible printed circuit (e.g., a printed circuit having metal traces supported by a sheet of polyimide or other flexible polymer layer) or a rigid printed circuit (e.g., a printed circuit board formed from a material such as fiberglass-filled epoxy). Components 54 may be mounted on substrate 52. Components 54 may include audio components, integrated circuits, capacitors, inductors, resistors, connectors, sensors, light-based devices, and other electronic components.

Device 10 may include one or more components such as component 40 that are associated with openings 22 in a port such as port 20 in housing 12. Component 40 may be a connector for a data port, an audio component such as a microphone or speaker, an audio jack connector to receive a mating audio plug or other plug, or other component. Illustrative configurations in which port 20 is associated with an audio component (i.e., configurations in which component 40 is an audio component) are sometimes described herein as an example. In general, component 40 may be any electrical component that is associated with a port in device 10 (e.g., a port formed from one or more openings 22 in device 10 such as openings 22 in housing 12).

To maintain port 20 free of contaminants, so that audio component 40 can function properly, device 10 can be provided with a shutter. As shown in FIG. 3, for example, shutter 46 may be interposed between openings 22 of port 20 and associated component 40. Shutter 46 may be placed in an open configuration so that openings 22 are unblocked and can serve as a pathway through housing 12 between the outside and inside of device 10 or can be placed in a closed position to prevent moisture, dirt, and other contaminants from entering into device 10 when port 20 is not in use. Because shutter 46 is used to control the open/closed state of openings 22 for port 20, shutter 46 is sometimes referred to as a port shutter.

Figure 4:
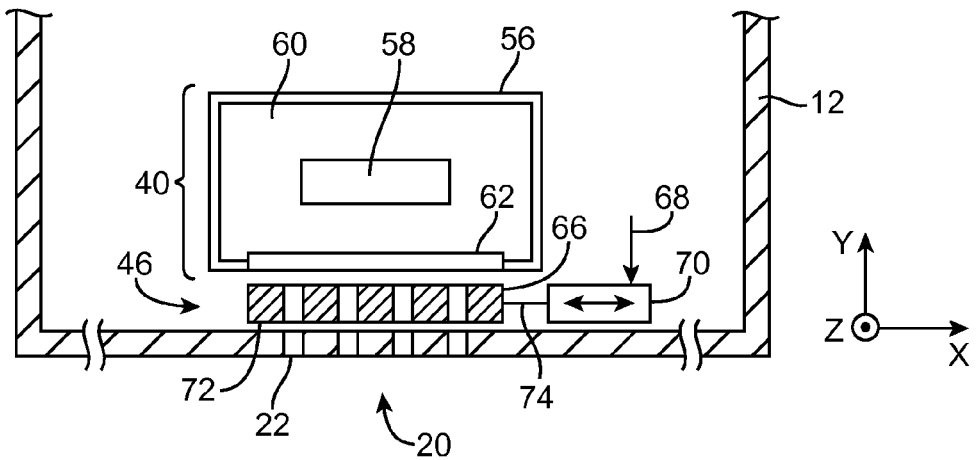
FIG. 4 is a top view of a portion of an electronic device in which a shutter is in an open position to allow sound to pass through a port in the electronic device in accordance with an embodiment.

FIG. 4 is a top view of an interior portion of the lower end of device 10 of FIG. 1. As shown in FIG. 4, port 20 may be formed from openings 22 in housing 12. Openings 22 may be circular, may be oval, may have rectangular cross-sectional shapes, or may have other suitable shapes. Shutter 46 has one or more movable shutter members such as shutter member 66 with openings 72 that overlap openings 22 when shutter 46 is placed in an open configuration of the type shown in FIG. 4. Shutter member 66 may be formed from metal, plastic, other materials, or combinations of these materials. Openings 74 may be slots or may have other shapes so that openings 74 each cover one or more respective housing openings 22, may be circular holes or holes with other shapes each of which is able to overlap only a single corresponding opening 22 in housing 12, or may have other suitable shapes. In some configurations, shutter member 66 may have no holes, but rather may be placed in configurations that either cover or uncover openings 22 as needed.

Positioner 70 may be coupled to shutter member 66 by coupling structures 74 (e.g., structures formed from plastic, metal, portions of shutter member 66, etc.). Positioner 70 may be controlled by control circuitry 40 (FIG. 2) using control signals from control circuitry 40 that are supplied to control input 68 of positioner 70. Positioner 70 may be a solenoid or other electromagnetic device for positioning shutter member 66, may be a motor for sliding or rotating shutter member 66, may be an actuator formed from a shape memory metal (e.g., a nichrome wire that changes shape upon application of heat generated by applying a current to the wire), may be a piezoelectric actuator, or may be any other suitable actuator for positioning shutter structures such as shutter member 66 in shutter 46.

Component 40 may be an audio component such as a speaker or microphone. As an example, component 40 may be a speaker having a speaker driver such as speaker driver 58. Speaker driver 58 may be mounted in air-filled cavity 60 in the interior of speaker box 56. Speaker box 56 may have plastic walls or other structures to form cavity 60 and to mount speaker 40 in device 10. Speaker box opening 62 may have perforations, metal and/or plastic mesh, or other openings to allow sound to pass from the interior of speaker 40 (i.e., cavity 60) to the exterior of speaker 40. If desired, component 40 may be an audio component such as a microphone or other suitable component. The example of FIG. 4 in which component 40 is a speaker is merely illustrative.

Figure 5:
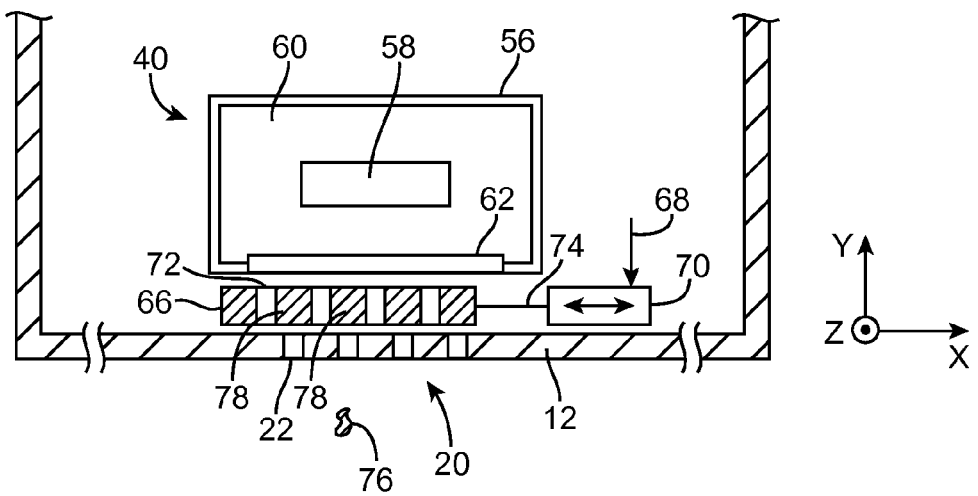
FIG. 5 is a top view of the electronic device of FIG. 4 in which the shutter has been placed in a closed position to prevent contaminants from passing through the port in accordance with an embodiment.

As shown in FIG. 4, opening 62 of speaker box 56 is aligned with shutter 46 and port 20. Shutter 46 is preferably formed on the interior of housing 12 to hide shutter components from view, but may, if desired, be formed partially or completely from structures on the exterior of housing 12. Shutter member positioner 70 may be used to open and close shutter 46. When, for example, it is desired to use port 20 normally (e.g., when it is desired to use speaker 40 normally to produce sound for a user of device 10), positioner 70 may place shutter member 66 in a position of the type shown in FIG. 4 in which shutter member openings 72 are aligned with and overlap respective openings 22 in port 20 in housing wall 12. When speaker 40 is inactive, positioner 70 can move shutter member 66 so that shutter member openings 72 are no longer aligned with openings 22. When control circuitry 40 determines that speaker 40 is not in use, for example, positioner 70 can slide shutter member 66 along the X-axis of FIG. 4 until openings 72 are not aligned with openings 22 in housing 12, as shown in FIG. 5. In the configuration of FIG. 5, shutter 46 is in a closed position in which solid portions 78 of shutter member 66 overlap and block openings 22 in housing 12. This prevents intrusion of contaminants 76 (e.g., solid and/or liquid substances such as food particles, dirt, moisture, etc.) into the interior of device 10 and housing 12.

Figure 6:
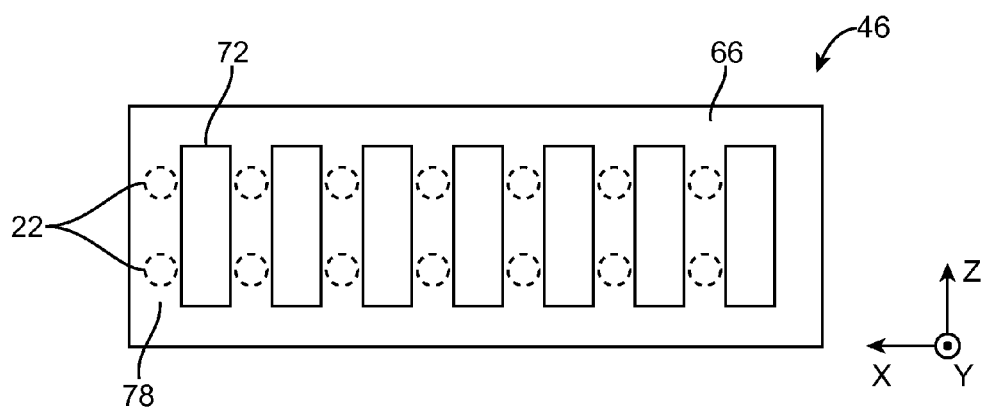
FIG. 6 is an interior view of an illustrative electronic device port having a horizontally sliding shutter that has been placed in a closed position in accordance with an embodiment.
Figure 7:
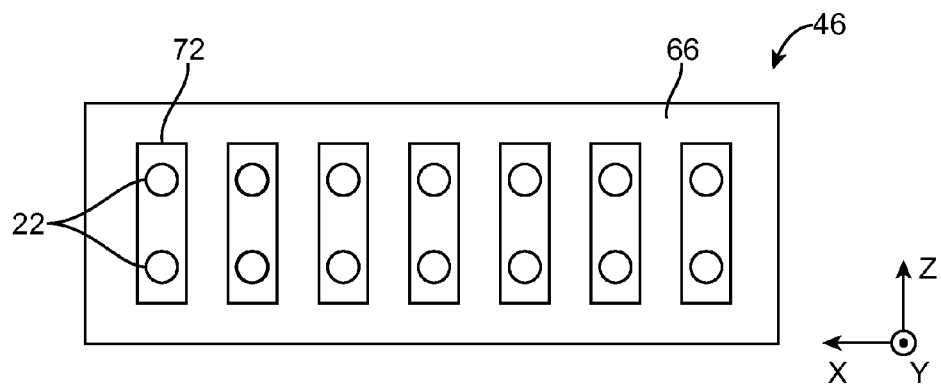
FIG. 7 is an interior view of the illustrative electronic device port of FIG. 6 following horizontal movement of the sliding shutter to place the shutter in an open position in accordance with an embodiment.

FIG. 6 shows an illustrative configuration for shutter member 66 in which shutter member 66 has an elongated shape that extends along the X-axis of FIG. 6 (e.g., along an edge of device housing 12). In the FIG. 6 example, openings 22 are provided in multiple rows and columns (e.g., two rows and seven columns). Other patterns of openings 22 may be formed in device housing 12 if desired (e.g., arrays of openings 22 with different numbers of rows and columns, etc.). As shown in FIG. 6, each opening 72 may form a rectangular slot that extends along dimension Z. By using elongated opening shapes for openings 72, each opening 72 can cover multiple openings 22. For example, each opening 72 may be a slot that is associated with two or more respective openings 22 in respective rows of an array of housing openings 22. In the state shown in FIG. 6, shutter 46 is closed and solid shutter member portions 78 cover openings 22 in housing 12 to prevent intrusion of contaminants into the interior of device 10. After sliding shutter member 66 laterally along axis X, slots 72 are brought into alignment with openings 22, as shown in FIG. 7. Each slot 72 may, for example, overlap a respective pair of openings 22. In the state shown in FIG. 7, shutter 46 is open and sound can pass through openings 22 and port 20.

Figure 8:
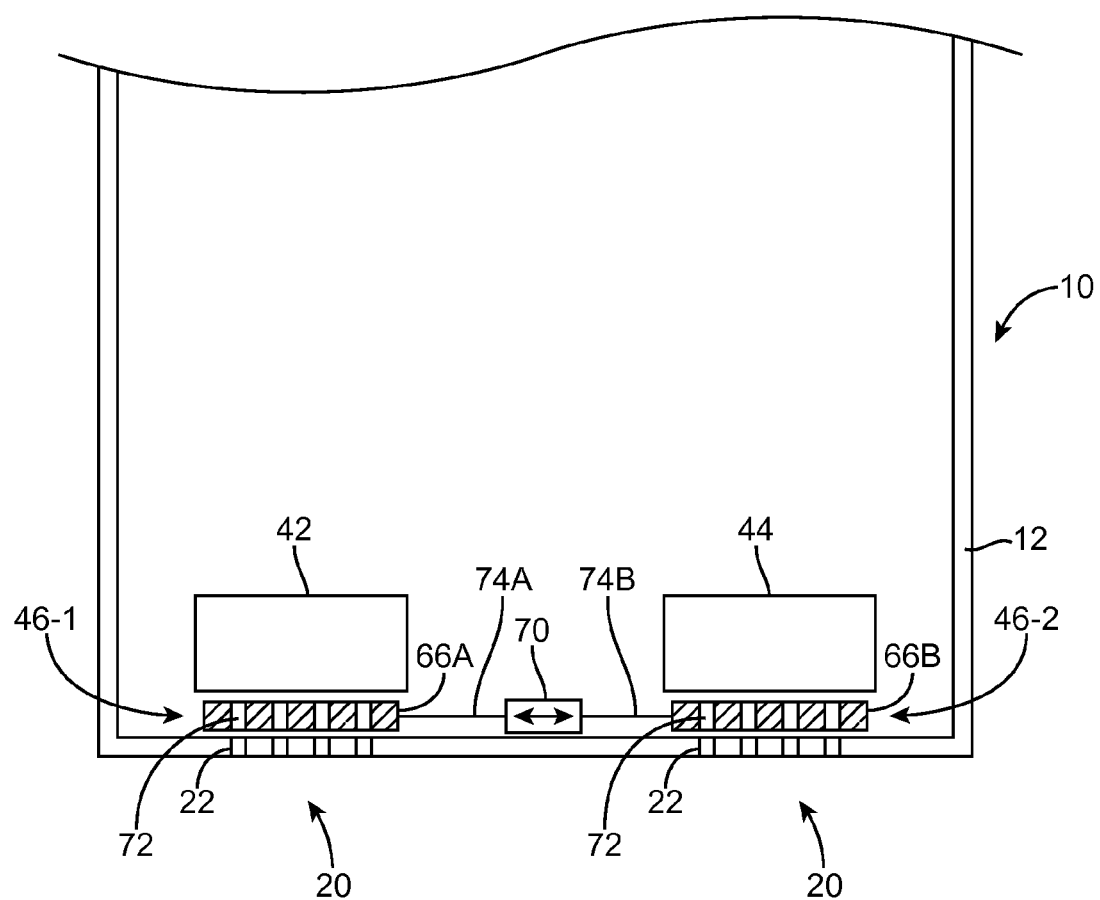
FIG. 8 is a top interior view of an illustrative electronic device having two shutters for protecting two respective ports in accordance with an embodiment.

If desired, device 10 can have multiple shutters. As shown in FIG. 8, for example, device 10 can have a first shutter such as shutter 46-1 formed from movable shutter member 66A and a second shutter such as shutter 46-2 formed from movable shutter member 66B. Shutter member 66A has openings 72 that can be moved in and out of alignment with respective openings 22 in one of ports 20 in housing 12. Shutter member 66B has openings 72 that can be moved in and out of alignment with respective openings 22 in another one of ports 20 in housing 12.

Each shutter may have its own respective electronically controlled positioner 70 or a common positioner may be used to control shutter members 66A and 66B. As shown in FIG. 8, for example, a single positioner 70 may be coupled to shutter member 66A via coupling member 74A and may be coupled to shutter member 66 via coupling member 74B. Positioner 70 may be used to move shutter members 66A and 66B in concert. If desired, shutter members 66A and 66B may be coupled using rigid coupling structures or may be formed from a single layer of material (e.g., a single layer of plastic, a single metal sheet, etc.).

Figure 9:
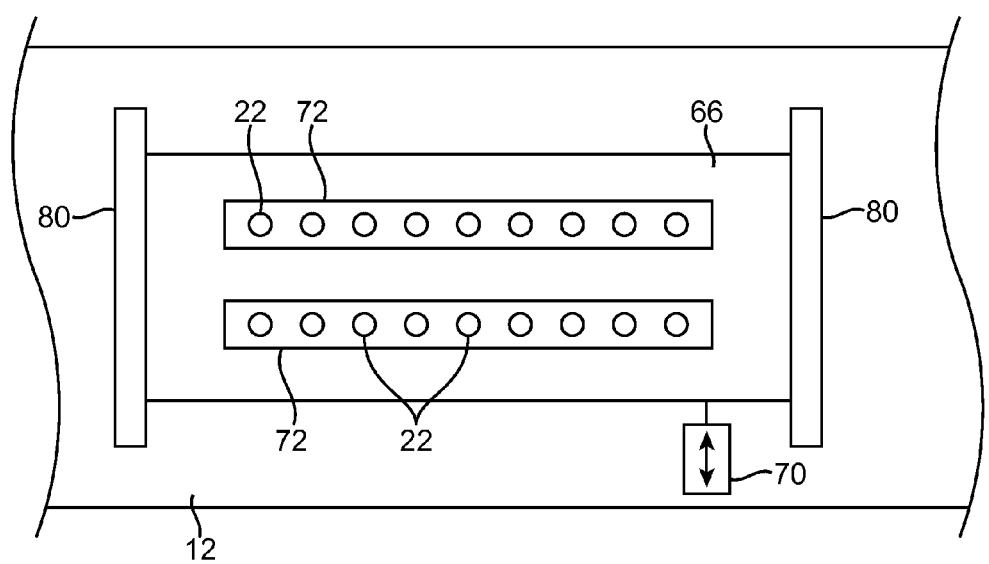
FIG. 9 is an interior view of an illustrative electronic device having a vertically sliding shutter with elongated horizontal shutter openings in accordance with an embodiment.

As shown in FIG. 9, the movement of shutter member 66 may be guided using guide structures such as slotted rails 80. Rails 80 in the FIG. 9 example, have slots that extend along dimension Z. The slots in rails 80 receive the opposing ends of shutter member 66. Member 66 may be formed from metal, plastic, other materials, or combinations of these materials. Positioner 70 may move shutter member 66 between open and closed positions along dimension Z. In the configuration shown in FIG. 9, shutter member 66 of shutter 46 is in an open position, so that each opening 72 overlaps and therefore uncovers a respective set of housing openings 22.

Figure 10:
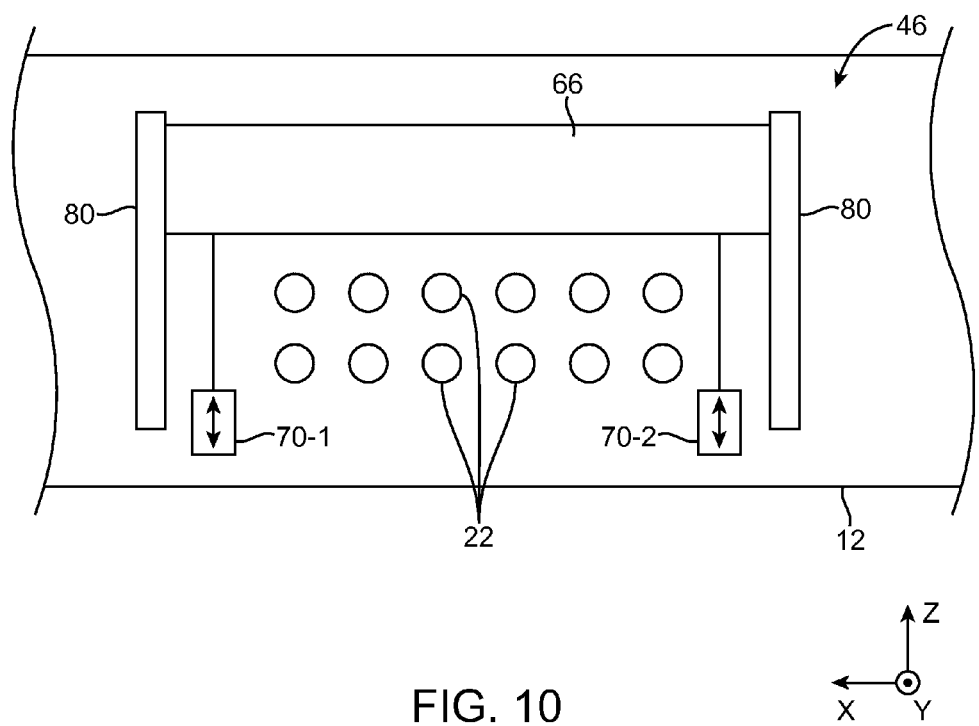
FIG. 10 an interior view of an illustrative electronic device having a solid vertically sliding shutter that is free of openings in accordance with an embodiment.

If desired, shutter member 66 may be formed from a solid structure that does not contain openings to align with openings 22 in port 20. As shown in FIG. 10, for example, shutter member 66 may be a rectangular structure or other structure that is free of openings 72. Shutter members in device 10 may be controlled using one or more positioners. In the example of FIG. 10, two positioners are used in controlling the position of shutter member 66. Positioner 70-1 controls the left-hand side of shutter member 66 and positioner 70-2 controls the right-hand side of shutter member 66. If desired, a single positioner may be used to position shutter member 66. The use of multiple positioners to control the position of shutter member 66 is merely illustrative. When it is desired to open shutter 46 of FIG. 10, positioning equipment such as one or more electronically controlled positioners (e.g., positioners 70-1 and 70-2) can be used to move shutter member 66 in dimension Z until shutter member 66 reaches the position of FIG. 10. In this position, shutter member 66 does not overlap holes 22, so holes 22 are not blocked by shutter member 66. When it is desired to close shutter 46, shutter member 66 may be moved in the −Z direction of FIG. 10 until shutter member 66 overlaps each of openings 22 and thereby blocks openings 22. Solid shutter members may be used to selectively cover and uncover any suitable number of openings 22. The use of shutter member 66 to cover and uncover a 2×6 array of openings 22 in FIG. 10 is merely illustrative.

Figure 11:
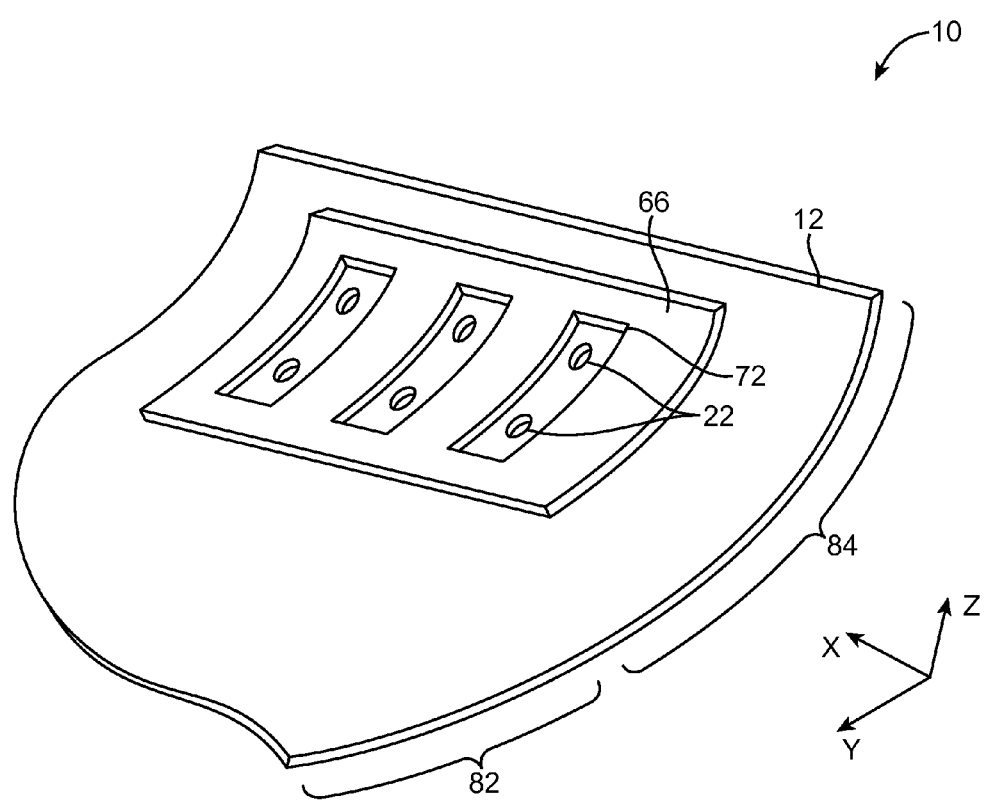
FIG. 11 is a perspective interior view of an illustrative electronic device with port openings formed in a curved housing sidewall and a curved port shutter with a shape that matches the curved housing sidewall in accordance with an embodiment.

Housing 12 may have planar portions and/or may have curved portions. As shown in FIG. 11, for example, housing 12 may have planar portion 82 and curved portion 84. Planar portion 82 may be part of a planar housing wall such as the rear wall of housing 12. Curved portions such as curved portion 84 of FIG. 11 may be associated with curved housing sidewalls. Curved sidewalls may, for example, be formed along each of the four peripheral edges of a rectangular electronic device housing. In configurations for housing 12 that include curved walls or other non-planar shapes, shutter member 66 may have corresponding non-planar shapes. For example, shutter member 66 may be provided with a curved surface that matches the curved inner surface of housing wall portion 84 of housing 12 as shown in FIG. 11. Openings 72 may be slots that lie in planes parallel to the Y-Z plane of FIG. 11 or may have other shapes.

Figure 12:
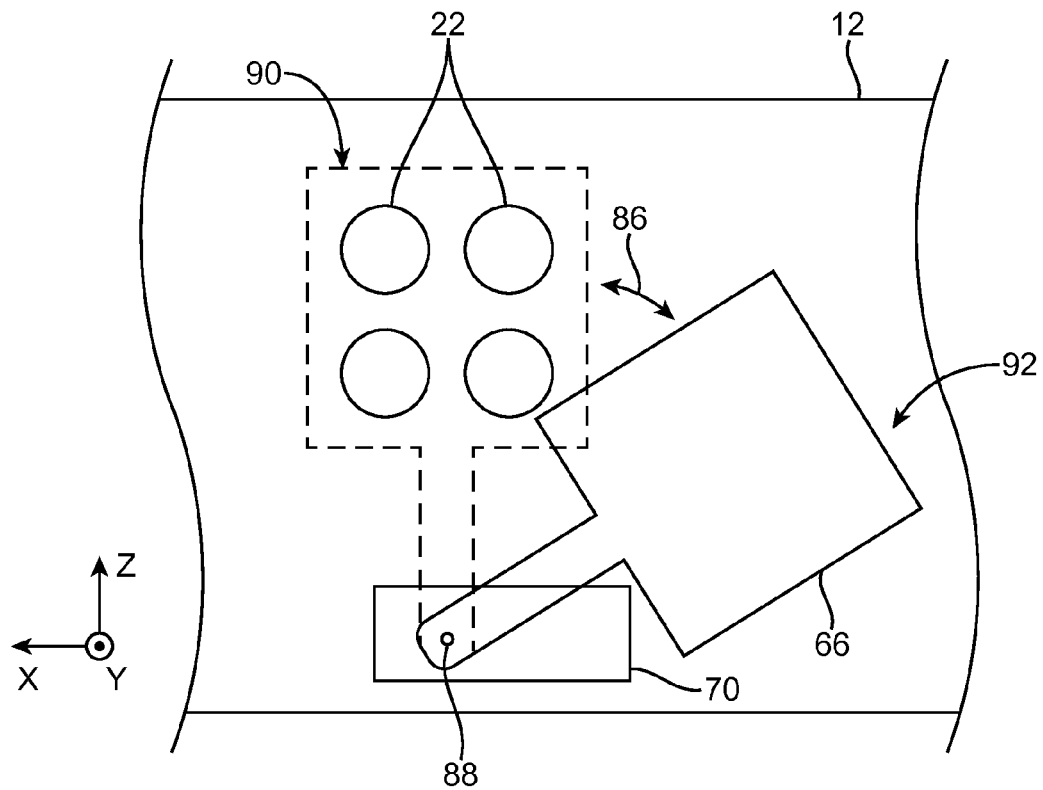
FIG. 12 is an interior view of an illustrative electronic device with a rotating shutter in accordance with an embodiment.

As shown in FIG. 12, shutter 46 may have a rotating shutter member. Positioner 70 of FIG. 12 may be a motor or other actuator that rotates shutter member 66 in directions 86 about rotational axis 88. In closed position 90, shutter member 66 covers openings 22 (i.e., shutter 46 is closed). In the open position shown in FIG. 12 (position 92), shutter member 66 does not overlap openings 22, so that openings 22 are unblocked and can serve as port openings for port 20.

Figure 13:
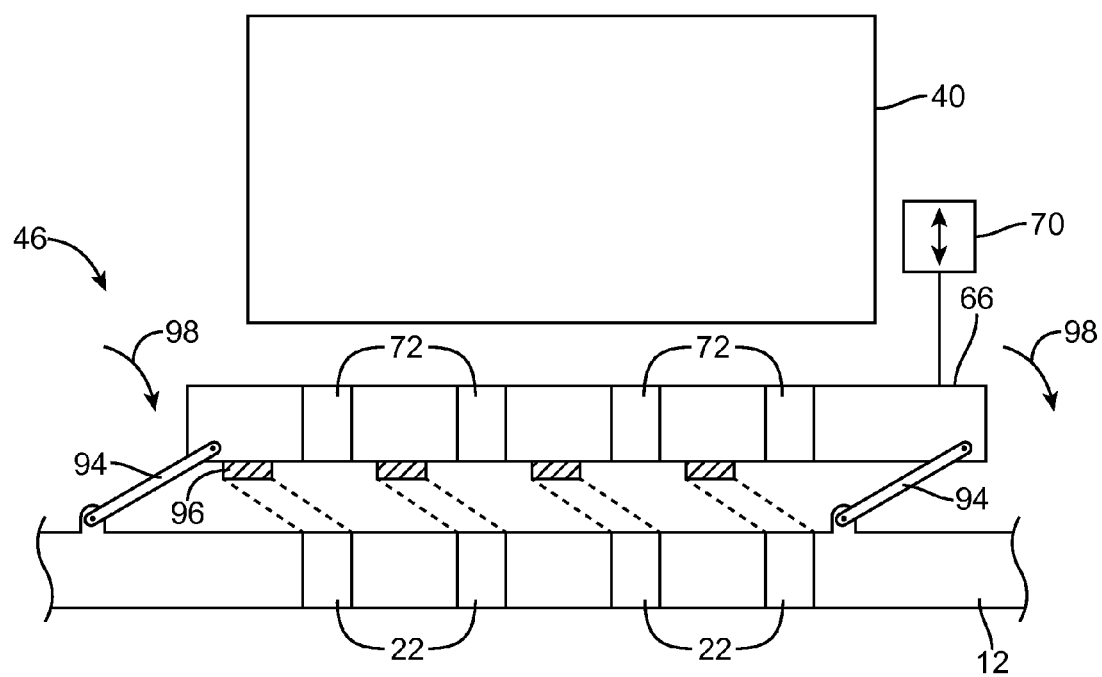
FIG. 13 is a top interior view of a portion of an illustrative electronic device having a linkage that allows a port shutter to open and close by respectively moving away from an interior housing surface and towards the interior housing surface in accordance with an embodiment.

FIG. 13 is a top view of an interior portion of device 10 in a configuration in which shutter 46 has been provided with a linkage to move shutter member 66 into closed and open positions without sliding shutter member 66 along the inner surface of housing 12. Linkage 94 may be formed from one or more coupling members with pivots that allow shutter member 66 to be moved towards and away from the inner surface of housing 12 without sliding along the inner surface of housing 12. In the position shown in FIG. 13, shutter member 66 has been placed in an open position in which shutter member openings 72 are aligned with housing port openings 22 to allow sound associated with the operation of component 40 (e.g., an audio component such as a microphone or speaker) to pass through openings 22. When positioner 70 moves shutter member 66 in direction 98, pivoting linkage 94 guides protrusions 96 on shutter member 66 into openings 22 so that openings 22 are blocked (i.e., shutter 46 is closed). Protrusions 96 may be formed as integral portions of shutter member 66 or may be additional structures. Protrusions 96 and/or the rest of shutter member 66 may be formed from an elastomeric material such as silicone to help form effective seals for openings 22. Configurations for linkage-based shutters that use rigid shutter members (e.g., shutter members formed from rigid plastic and/or metal) may also be used.

Figure 14:
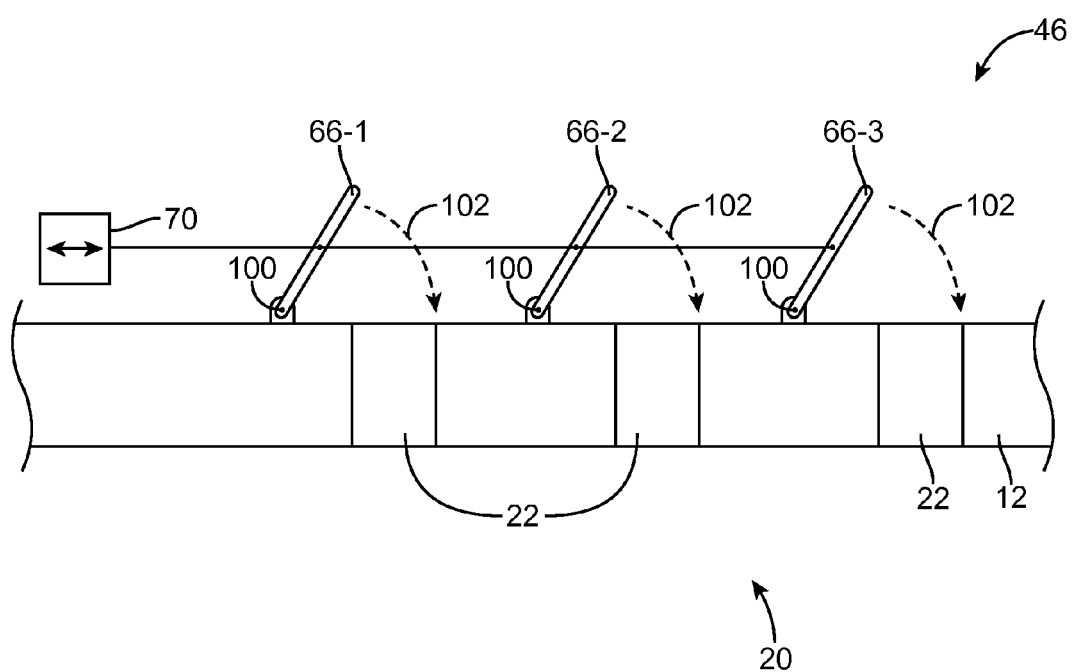
FIG. 14 is a top interior view of an illustrative electronic device having a louvered port shutter in accordance with an embodiment.

If desired, shutter 46 may be implemented using multiple louvers such shutter structures 66-1, 66-2, and 66-3 of FIG. 14. Positioner 70 may control the positions of each louver. When it is desired to open shutter 46, each louver is rotated clockwise about a respective pivot until a respective opening or openings 22 in device housing wall 12 has been uncovered as shown in FIG. 14. When it is desired to close shutter 46, positioner 70 closes the louvers (i.e., members 66-1, 66-2, and 66-3 are rotated clockwise in direction 102), thereby covering respective openings 22 and blocking port 20.

Figure 15:
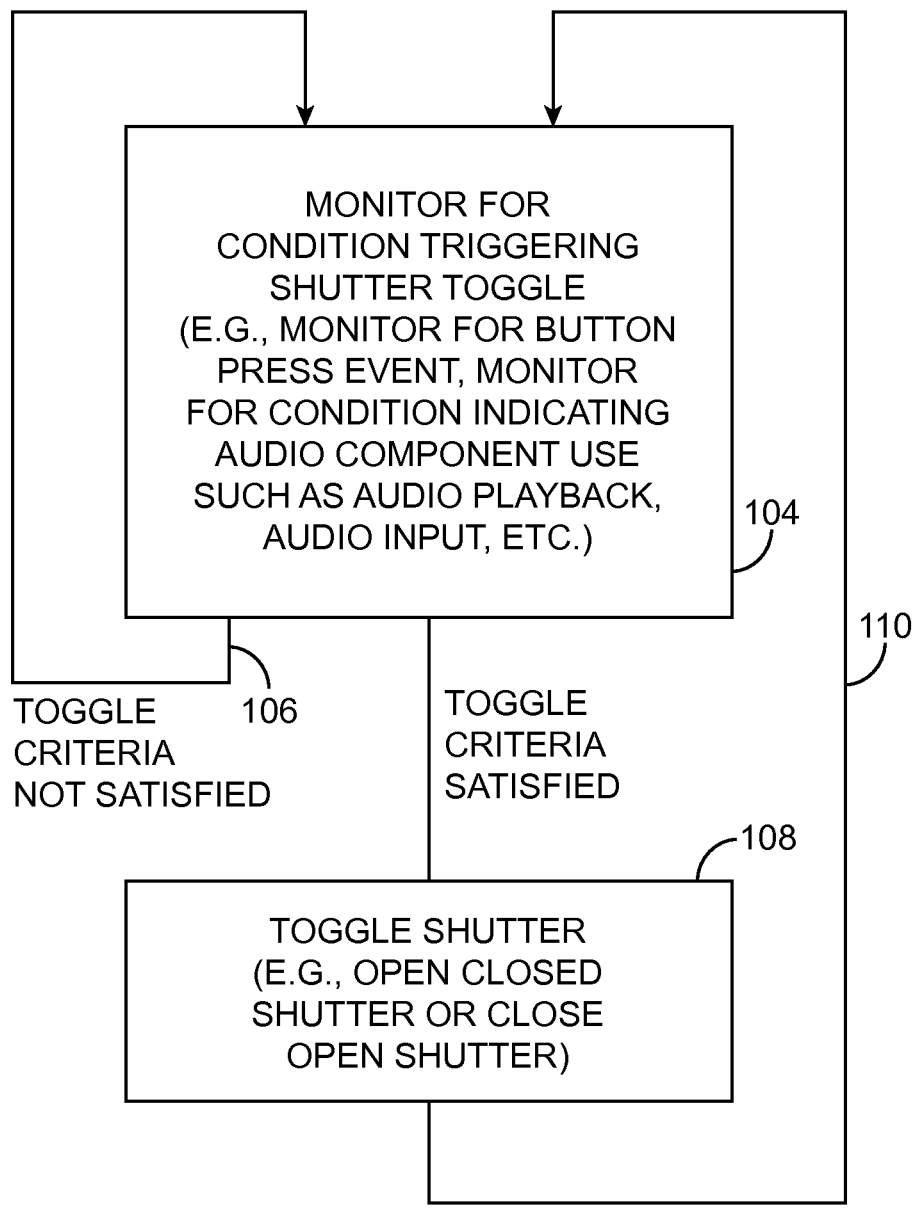
FIG. 15 is a flow chart of illustrative operations involved in operating a shutter for a housing port in an electronic device in accordance with an embodiment.

Illustrative steps associated with operating shutters 46 in electronic devices 10 to block and unblock ports 20 in device 10 are shown in FIG. 15. At step 104, control circuitry 40 monitors device 10 to determine whether shutter toggling criteria have been satisfied. The shutter togging criteria may be predetermined criteria stored in storage in control circuitry 40. Examples of shutter toggling criteria include detection of an appropriate button press event or selection of an appropriate on-screen option with a touch screen, reception of an appropriate voice command, occurrence of an operating condition that indicates whether a port in device 10 should be blocked or unblocked (e.g., detection of a state in which audio is to be played for the user with a speaker in port 20 such as a speakerphone voice call in a cellular telephone or a media playback event in which audio is to be played for the user with the speaker in port 20, detection of an audio recording event in which a microphone in port 20 is to be used to record audio data, etc.). During the operations of step 104, control circuitry 40 can monitor the state of input-output circuitry 32. For example, control circuitry 40 can monitor communications circuitry 34 to determine whether a user is making a speakerphone call or is playing audio through a speaker in port 20, control circuitry 40 can monitor input-output devices 36 to determine whether a user has supplied an open-shutter or close-shutter command or has otherwise supplied input to device 10 that is indicative of a need to change the state of shutter 46, and control circuitry 40 can monitor sensors 38 to determine whether it is appropriate to change the state of shutter 46 (e.g., to detect moisture, to detect other contaminants, or to detect other environmental conditions that make it advisable to close shutter 46, etc.). Shutter 46 can be maintained in a normally closed condition and opened in response to detection of a condition that requires the use of port 20 or may be maintained in a normally opened condition in which shutter 46 is closed upon detection of a condition where there is an elevated risk of intrusion of contaminants (as examples).

So long as no toggle criteria are satisfied, monitoring continues at step 104, as indicated by line 106.

When toggle criteria are satisfied, the state of shutter 46 is toggled at step 108. For example, if shutter 46 is presently open, shutter 46 is closed at step 108 and if shutter 46 is currently closed, shutter 46 is opened at step 108.

As shown by line 110, monitoring may continue at step 104 following the opening or closing of shutter 46 during the shutter state toggling operations of step 108.

Figure 16:
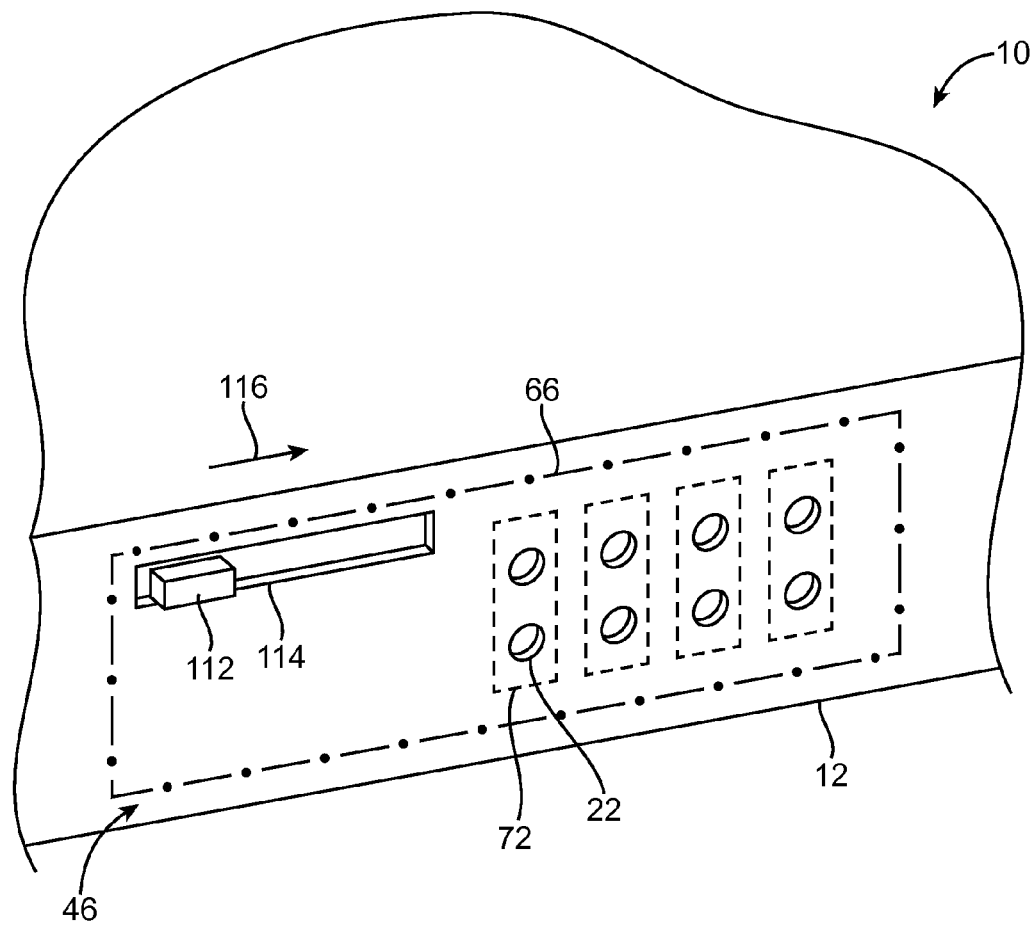
FIG. 16 is a perspective exterior view of a portion of an illustrative electronic device having a manually actuated port shutter in accordance with an embodiment.

To conserve power and/or to provide a manual backup capability, it may be desirable to provide a user of device 10 with the ability to manually change the position of shutter 46. This type of arrangement is shown in FIG. 16. As shown in FIG. 16, housing 12 may have an elongated opening such as opening 114 to accommodate a manual control structure such as shutter member protrusion 112 of shutter member 66. Shutter member 66 may have openings such as slots 72 that overlap openings 22 in housing 12 as shown in FIG. 16. When it is desired to close shutter 46, a user may slide protrusion 112 or other shutter member structure coupled to shutter member 66 in direction 116. This moves the solid portions of shutter member 66 so that they overlap housing openings 22 and thereby block openings 22 to prevent the intrusion of contaminants into the interior of device housing 12. If desired, device 10 may be provided with a combination of manually controlled and electrically controlled shutters. Electrically controlled shutters may be controlled automatically and/or may be responsive to open and close commands supplied to control circuitry 40 by a user.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a housing having a port, wherein the port has a plurality of housing openings that pass through the housing; and
a shutter aligned with the port that is operable in an open position in which the port is unblocked and a closed position in which the port is blocked, wherein the shutter comprises a movable shutter member having shutter member openings that overlap the housing openings when the shutter is in the open position.

2. The electronic device defined in claim 1 further comprising an audio component aligned with the port.

3. The electronic device defined in claim 2 wherein the audio component comprises a microphone and wherein the shutter is interposed between the microphone and the port.

4. The electronic device defined in claim 2 wherein the audio component comprises a speaker and wherein the shutter is interposed between the speaker and the port.

5. The electronic device defined in claim 1 wherein the plurality of housing openings pass through the housing from within the electronic device to outside of the electronic device.

6. The electronic device defined in claim 1 wherein the housing openings form an array of housing openings having multiple rows.

7. The electronic device defined in claim 6 wherein the movable shutter member comprises a sliding shutter member with slots that each overlap one of the housing openings in a first of the rows and one of the housing openings in a second of the rows.

8. The electronic device defined in claim 1 wherein the shutter comprises a pivot.

9. The electronic device defined in claim 1 wherein the shutter comprises:
an electronically controlled positioner that positions the movable shutter member.

10. The electronic device defined in claim 1 wherein the housing has a curved wall portion with a housing opening, wherein the port is formed from the housing opening, and wherein the movable shutter member comprises a curved sliding member with a shape that matches the curved wall portion.

11. The electronic device defined in claim 1 further comprising:
a display in the housing, wherein the housing has sidewalls and wherein the port is formed from a housing opening in one of the sidewalls.

12. An electronic device, comprising:
a housing having a plurality of openings forming a housing port;
an audio component in an interior portion of the housing, wherein the audio component is aligned with the housing port; and
a shutter having a movable shutter member that is selectively placed in an open position in which each of the plurality of openings is unblocked and sound exits the interior portion of the housing through each of the plurality of openings and a closed position in which each of the plurality of openings is blocked to prevent contaminants from entering the interior portion of the housing.

13. The electronic device defined in claim 12 further comprising:
control circuitry that determines when shutter toggling criteria have been satisfied; and
a positioner that the control circuitry controls to toggle the shutter between the closed and open positions in response to determining that the shutter toggling criteria have been satisfied.

14. A portable electronic device, comprising:
a housing having a rear wall and four sidewalls;
a rectangular display mounted in the housing and surrounded by the four sidewalls;
a housing port formed from a housing opening in one of the four sidewalls;
a speaker in an interior portion of the housing in alignment with the housing port; and
a rotating shutter interposed between the speaker and the housing port, wherein the rotating shutter rotates about an axis from a first position in which the rotating shutter overlaps the opening to a second position in which the rotating shutter does not overlap the opening.

15. The portable electronic device defined in claim 14 wherein the axis is orthogonal to the sidewall in which the housing opening is formed.

16. The portable electronic device defined in claim 14 wherein the axis is parallel to the sidewall in which the housing opening is formed.

17. The portable electronic device defined in claim 14 wherein the housing port is formed from a plurality of housing openings in the one of the four sidewalls, and wherein a corresponding plurality of rotating shutters is interposed between the speaker and the plurality of housing openings.

* * * * *